US012155645B2

(12) United States Patent
Ponnuru et al.

(10) Patent No.: US 12,155,645 B2
(45) Date of Patent: Nov. 26, 2024

(54) SYSTEMS AND METHODS FOR RECLAIMING IDENTITY CREDENTIALS IN A CLOUD MANAGEMENT SERVICE

(71) Applicant: Dell Products, L.P., Round Rock, TX (US)

(72) Inventors: Viswanath Ponnuru, Bangalore (IN); Magesh Kumar Sivaswamy, Bangalore (IN); Judith A. Furlong, Natick, MA (US)

(73) Assignee: Dell Products, L.P., Round Rock, TX (US)

( * ) Notice: Subject to any disclaimer, the term of this patent is extended or adjusted under 35 U.S.C. 154(b) by 238 days.

(21) Appl. No.: 18/050,079

(22) Filed: Oct. 27, 2022

(65) Prior Publication Data

US 2024/0146715 A1 May 2, 2024

(51) Int. Cl.
*H04L 9/40* (2022.01)
*H04L 9/08* (2006.01)
*H04L 9/32* (2006.01)
*H04W 12/0471* (2021.01)
*H04W 12/069* (2021.01)

(52) U.S. Cl.
CPC ............ *H04L 63/0823* (2013.01); *H04L 9/08* (2013.01); *H04L 9/3263* (2013.01); *H04L 9/3271* (2013.01); *H04L 63/06* (2013.01); *H04W 12/0471* (2021.01); *H04W 12/069* (2021.01)

(58) Field of Classification Search
CPC ..... H04L 63/08; H04L 63/0823; H04L 63/06; H04L 63/061; H04L 63/062; H04L 9/08; H04L 9/0819; H04L 9/3263; H04L 9/3271; H04W 12/0471; H04W 12/0431; H04W 12/04; H04W 12/06; H04W 12/069
See application file for complete search history.

(56) References Cited

U.S. PATENT DOCUMENTS

| | | | |
|---|---|---|---|
| 2021/0136082 A1* | 5/2021 | Andrews | H04L 63/105 |
| 2022/0158835 A1* | 5/2022 | Vedeshwar | H04L 9/0866 |
| 2022/0239639 A1* | 7/2022 | Jasleen | G06F 21/36 |
| 2023/0319026 A1* | 10/2023 | Waltermann | H04L 63/0823 726/3 |

* cited by examiner

*Primary Examiner* — Shaqueal D Wade-Wright
(74) *Attorney, Agent, or Firm* — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include computer-executable instructions to, when a signed certificate associated with a client expires, challenge the client by transmitting a first plurality of keys to a client IHS, wherein the client IHS is configured to respond the challenge by associating each of the keys with a second plurality of keys, pairing each of the first key with its associated second key, sending the paired first and second keys to the server IHS, and authenticate the client IHS by verifying that each of the first plurality of keys is associated with the second plurality of keys.

20 Claims, 6 Drawing Sheets

SYSTEMS AND METHODS FOR RECLAIMING IDENTITY CREDENTIALS IN A CLOUD MANAGEMENT SERVICE

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Maintaining security across varying trust boundaries or domains over a communications network is an important facet of computing technology. A trust boundary may be referred to as a region within which a group of IHSs, their operations, and the data they use are trusted among one another. Typically, a trust boundary may be protected by computer security hardware and software such as firewalls, Virtual Private Networks (VPNs), intrusion detection and prevention systems, data leakage protections, antivirus programs, and the like. For an individual, a single laptop computer used in a person's home could comprise a trust boundary, while for an organization, a trust boundary may include an entire data center infrastructure, which may also include IHSs connected via VPNs.

Enterprises are increasingly making use of cloud driven computing models. For example, Software as a service (SaaS) includes a software distribution model in which a cloud provider hosts applications and makes them available to end users over a network, such as the Internet. To provide SaaS, a software vendor (ISV) may contract a third-party cloud provider to host the application. With larger companies, however, the cloud provider could also be the software vendor. SaaS is one of three main categories of cloud computing, alongside infrastructure as a service (IaaS) and platform as a service (PaaS). A range of IT professionals, business users and personal users use SaaS applications. Products range from personal entertainment, such as online video streaming services for end consumers to advanced IT tools, such as Cloud storage. Current trends in secure device identification and authentication has led to the use of digital certificates (e.g., X.509 certificates) and Public Key Infrastructure (PKI). Centralized identity management mechanisms, such as PKI, often uses a centralized trust anchor, a certificate authority (CA), for attesting to the validity of keying material.

SUMMARY

Embodiments of systems and methods to provide a firmware update to devices configured in a redundant configuration in an Information Handling System (IHS) are disclosed. In an illustrative, non-limiting embodiment, an IHS may include computer-executable instructions to, when a signed certificate associated with a client expires, challenge the client by transmitting a first plurality of keys to a client IHS, wherein the client IHS is configured to respond the challenge by associating each of the keys with a second plurality of keys, pairing each of the first key with its associated second key, sending the paired first and second keys to the server IHS, and authenticate the client IHS by verifying that each of the first plurality of keys is associated with the second plurality of keys.

According to another embodiment, an identity credential re-claiming method includes the steps of challenging, by a server Information Handling System (HIS), a client IHS by transmitting a plurality of first keys to a client IHS, and responding, by the client IHS, to the challenge by associating each of the first keys with a plurality of second keys, pairing each of the first key with its associated second key, and sending the paired first and second keys to the server IHS. The method further includes the step of authenticating, by the server IHS, the client IHS by verifying that each of the first plurality of keys is associated with the second plurality of keys.

According to yet another embodiment, a client Information Handling System (IHS) includes computer-executable instructions to receive multiple first keys from a server HIS in which the server IHS configured to send the first keys when the client IHS is to be claimed by the server HIS. The instructions may be further executed to generate a multiple second keys by associating each of the first keys with each of the second keys, pairing each of the first key with its associated second key, and sending the paired first and second keys to the server HIS. The server IHS is configured to authenticate the client IHS by verifying that each of the first keys is associated with the second keys.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
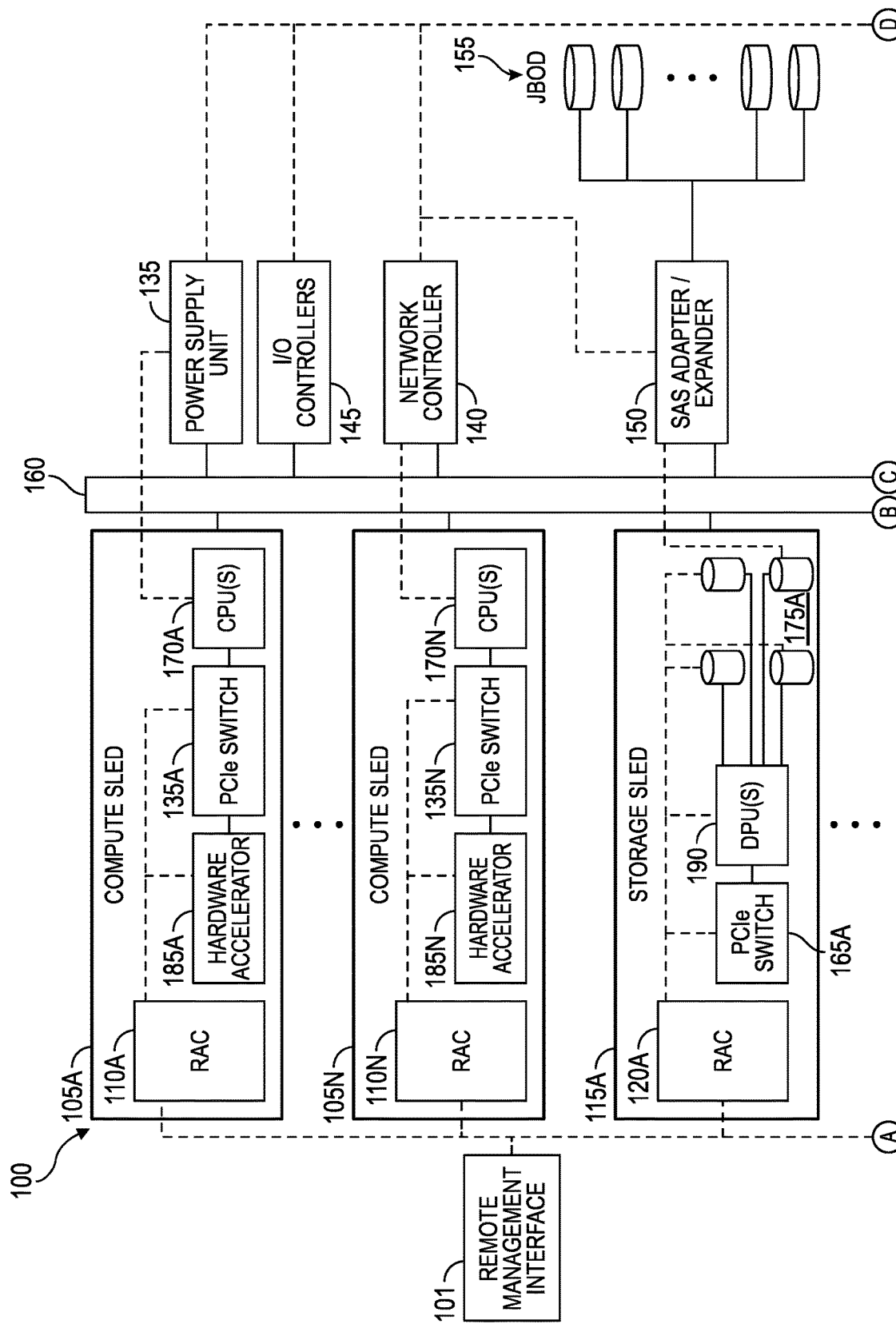
FIGS. 1A and 1B are block diagrams illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

In the world of distributed systems, a management software implementation needs to manage remote end points (nodes/software/devices), which are located across the WAN network in any of the deployment scenario such as on-premises or multi-cloud, either standalone or as VM installations or a microservices cluster. These remote clients are typically first claimed through a cloud-based service (e.g., Dell APEX) secure process after end points are validated and managed through a secure channel. It is expected that the remote client will, from time to time, renew the CA signed certificate used to establish the secure channel (e.g., mutual TLS (mTLS)) before it expires.

The process of refreshing the certificate depends on the remote client, which must initiate and get a new CA signed certificate before it expires. However, there are cases where the remote client is unable to process the client certificate renewal process for several reasons. For example, a client (e.g., Dell Connectivity Module (DCM) client), which functions as a gateway to one or more end nodes, loses its connection with a cloud server due to some unexpected reason, such as natural disaster, war, sabotage, and the like. Additionally, a cloud server gateway (e.g., DCM Aggregator) might fail to notify client to renew the certificate.

In either of these scenarios, the time window for certificate renewal may be lost. The process of claiming the remote client secure credentials that includes new certificate is often a time consuming procedure involving responsible personnel, such as site reliability engineer (SRE), to re-verify the client credentials. Such a time consuming endeavor can also cause intermediate service disruptions. As will be described in detail herein below, embodiments of the present disclosure provide a solution to this problem, among other problems, via an identity credential re-claiming system and method that identifies and reclaims the remote client through a secure negotiation process without necessarily needing to restart the detailed claim process. In some embodiments, the entity credential re-claiming system and method may use a crypto challenge and authorized random keys for establishing secure session with expired certificate scenarios where PKI is unable to process the client renewal request.

Figure 1B:
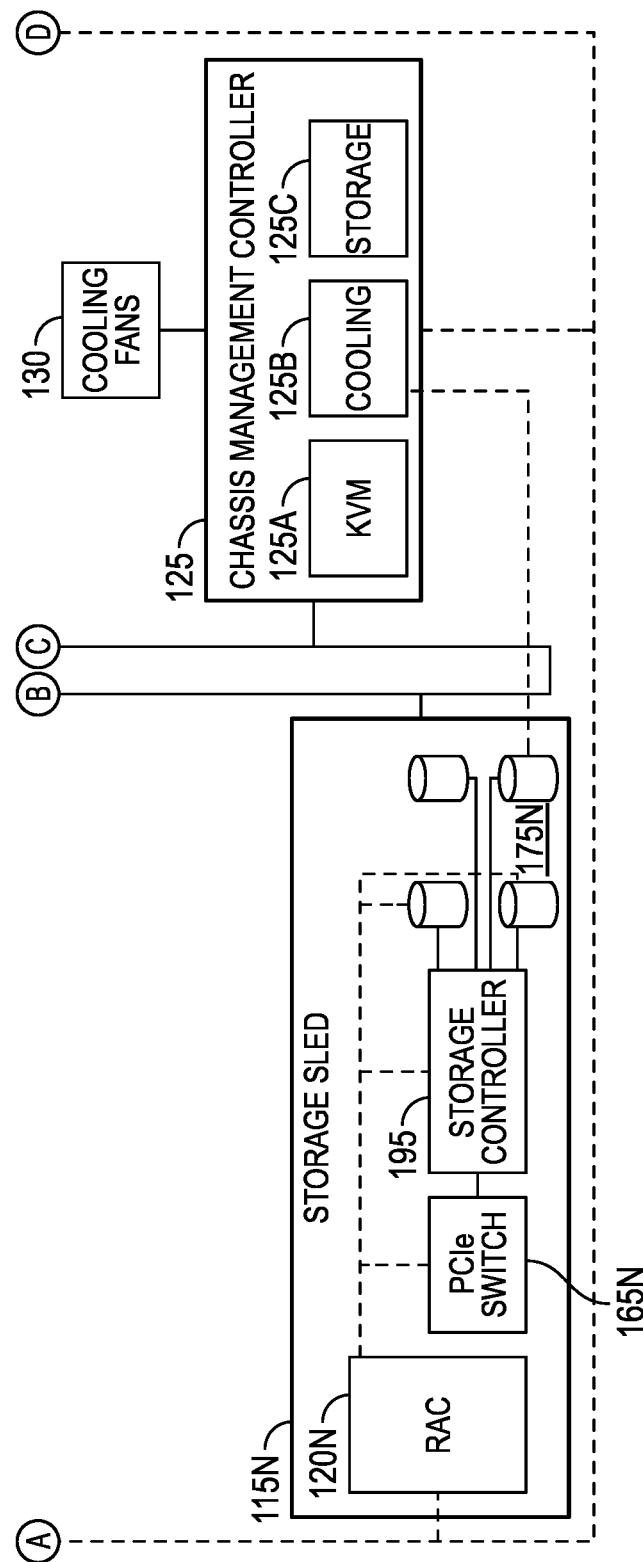

FIGS. 1A and 1B are block diagrams illustrating certain components of a chassis 100 comprising one or more compute sleds 105a-n and one or more storage sleds 115a-n that may be configured to implement the systems and methods described according to one embodiment of the present disclosure. Embodiments of chassis 100 may include a wide variety of hardware configurations in which one or more sleds 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105a-n, 115a-n that are installed in the chassis. In addition, once the chassis 100 has been deployed, firmware used by individual hardware components of the sleds 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power, and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the sleds 105a-n, 115a-n of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
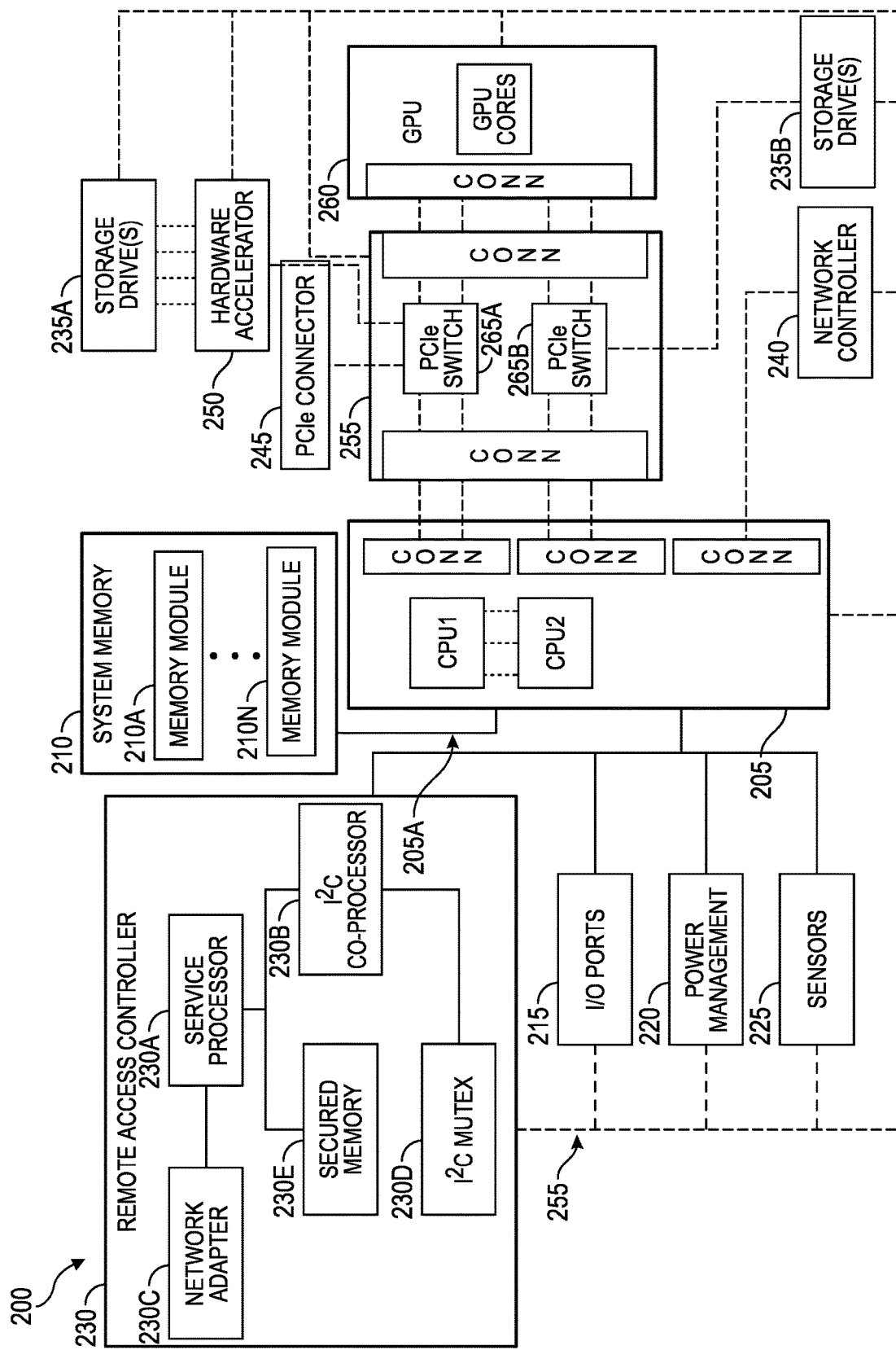
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional JBOD storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, SmartNIC, GPU and/or FPGA, that may be connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the CPUs 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
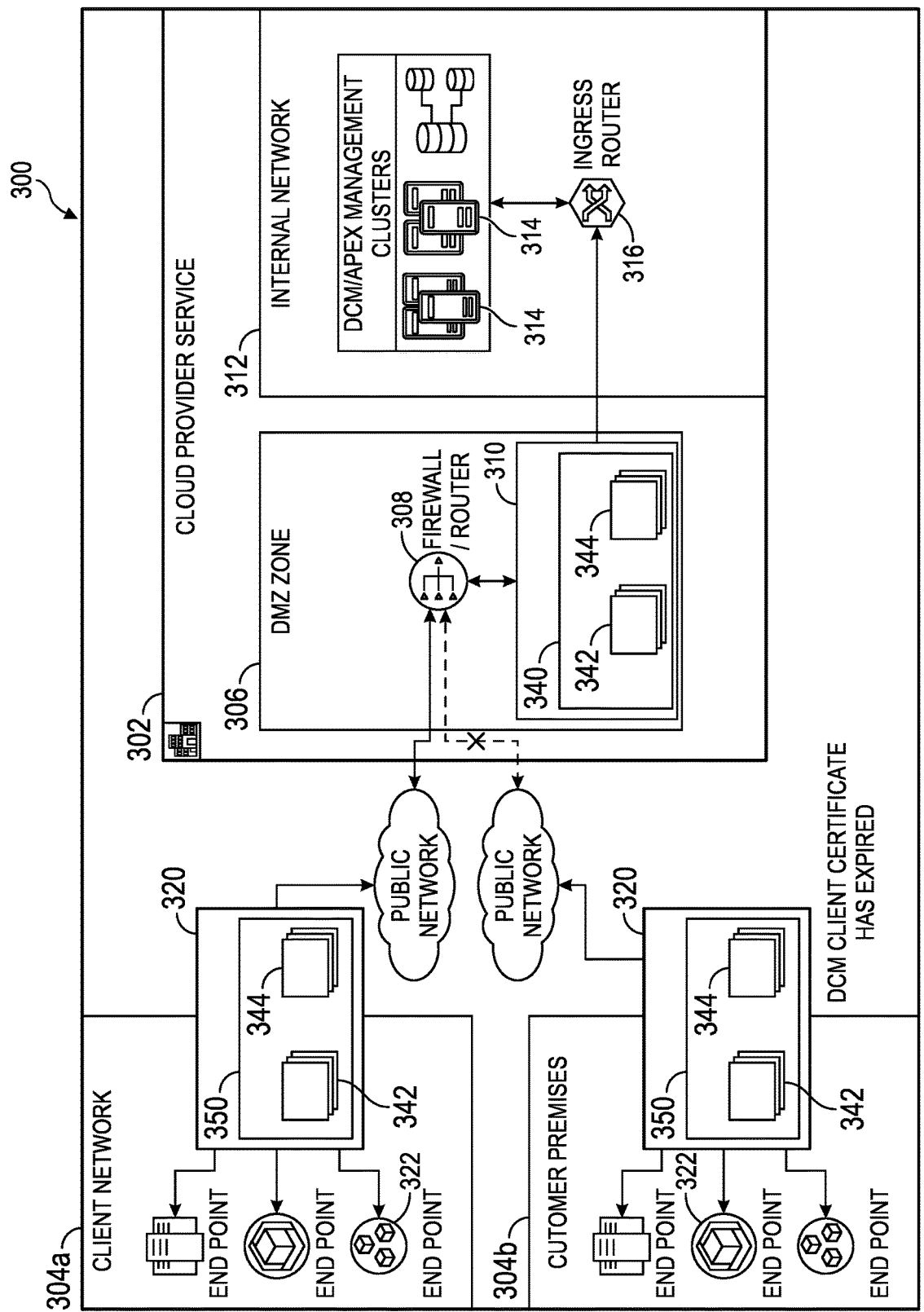
FIG. 3 illustrates an example computing environment in which the identity credential re-claiming system and method may be used to reclaim the remote client through a secure negotiation process without necessarily needing to restart the detailed claim process according to one embodiment of the present disclosure.

FIG. 3 illustrates an example computing environment 300 in which the identity credential re-claiming system and method may be used to reclaim the remote client through a secure negotiation process without necessarily needing to restart the detailed claim process according to one embodiment of the present disclosure. The computing environment 300 includes a cloud computing service 302 that communicates with, and provides online cloud-based services for multiple client networks 304a-b (collectively 304). The cloud computing service 302 generally includes a Demilitarized (DMZ) zone 306 comprising a firewall 308 and a cloud computing aggregator 310, which communicates with an internal network 312 with one or more management clusters 314 that provides the cloud-based services for the client network 304. The DMZ zone 306 communicates with the internal network 312 via an ingress router 316. Each client network 304 may include a cloud computing client 320 that functions as a gateway for one or more end points 322. The cloud-based services are provided to each client network 304 via a publicly available network 330, such as Internet. In other embodiments, it is contemplated that the entity credential re-claiming system and method may be provided on other computing environments having fewer, additional, or different components than what is shown herein.

According to the teachings of the present disclosure, the cloud computing aggregator 310 is configured with a secure memory 340 for storing a first set of keys 342 and a second set of keys 344. Additionally, cloud computing client 320 is configured with a secure memory 350 for storing a copy of the first set of keys 342 and the second set of keys 344. The keys 342, 344 may be any suitable type of encryption key, such as digital certificates (e.g., X.509 certificates) issued as part of a Public Key Infrastructure (PKI). In general, each key comprises a secret shared between the cloud computing aggregator 310 and the cloud computing client 320.

During normal operation, the cloud computing client 320 possesses a CA signed certificate that is renewed from time to time. For example, the cloud computing aggregator 310 may issue a new certificate at ongoing intervals, such as periodically (e.g., once a month) for enhancing the security of the communication link between the cloud computing aggregator 310 and cloud computing client 320.

The cloud computing aggregator 310 may issue the new certificate as the current interval is nearing completion. For an example in which the interval time window is once a month, the cloud computing aggregator 310 may issue the new certificate with four to seven days left in the current interval. Thus, once the new certificate is received by the cloud computing client 320, the cloud computing aggregator 310 may provide a time window (e.g., 4-7 days) in which the new certificate can be activated using the current secure connection provided by the current certificate. Nevertheless, scenarios, such as catastrophic whether events (e.g., tornadoes, hurricanes, floods, etc.), sabotage (e.g., fire, explosions), and the like exist whereby the cloud computing client 320 is not able to renew the certificate within the established time window. When such scenarios occur, the secure connection between the cloud computing aggregator 310 and cloud computing client 320 is lost, and a complex, time consuming re-claiming process may be required to re-establish the secure connection using conventional techniques. As shown, client network 304b has allowed its certificate to expire such that no secure connection exists any longer between the cloud computing aggregator 310 and cloud computing client 320.

Embodiments of the present disclosure provide a solution to this problem, among others, by providing a first set of keys 342, which are generated by the cloud computing aggregator 310 when the cloud computing client 320 is initially claimed for the first time. At this time, the cloud computing aggregator 310 sends the first set of keys 342 to the cloud computing client 320, which stores them in the secure memory 350. Using the first set of keys 342, the cloud computing client 320 generates a second set of keys 344, one for each key 342 in the first set, thus forming a key pair for each key in the first and second set of keys 342, 344. Once generated, the cloud computing client 320 sends a copy of the second set of keys 344 to the cloud computing aggregator 310, which stores them in its secure memory 340. In the event that the certificate expires, the keys 342, 344 may be shared between the cloud computing aggregator 310 and cloud computing client 320 as described herein below so that a complex, time consuming reclaiming process may not be needed.

Figure 4A:
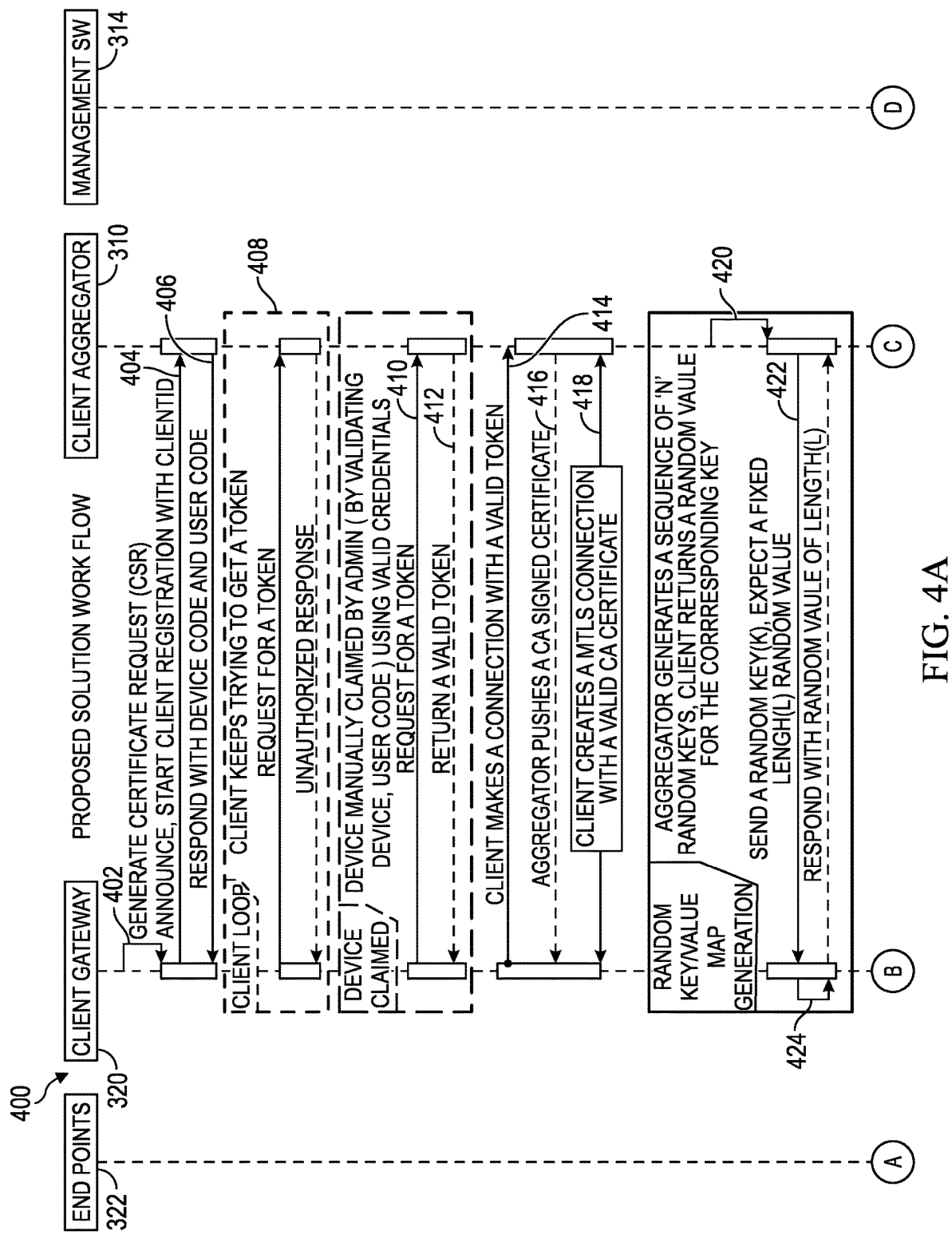
FIGS. 4A and 4B illustrate an example identity credential re-claiming method according to one embodiment of the present disclosure.
Figure 4B:
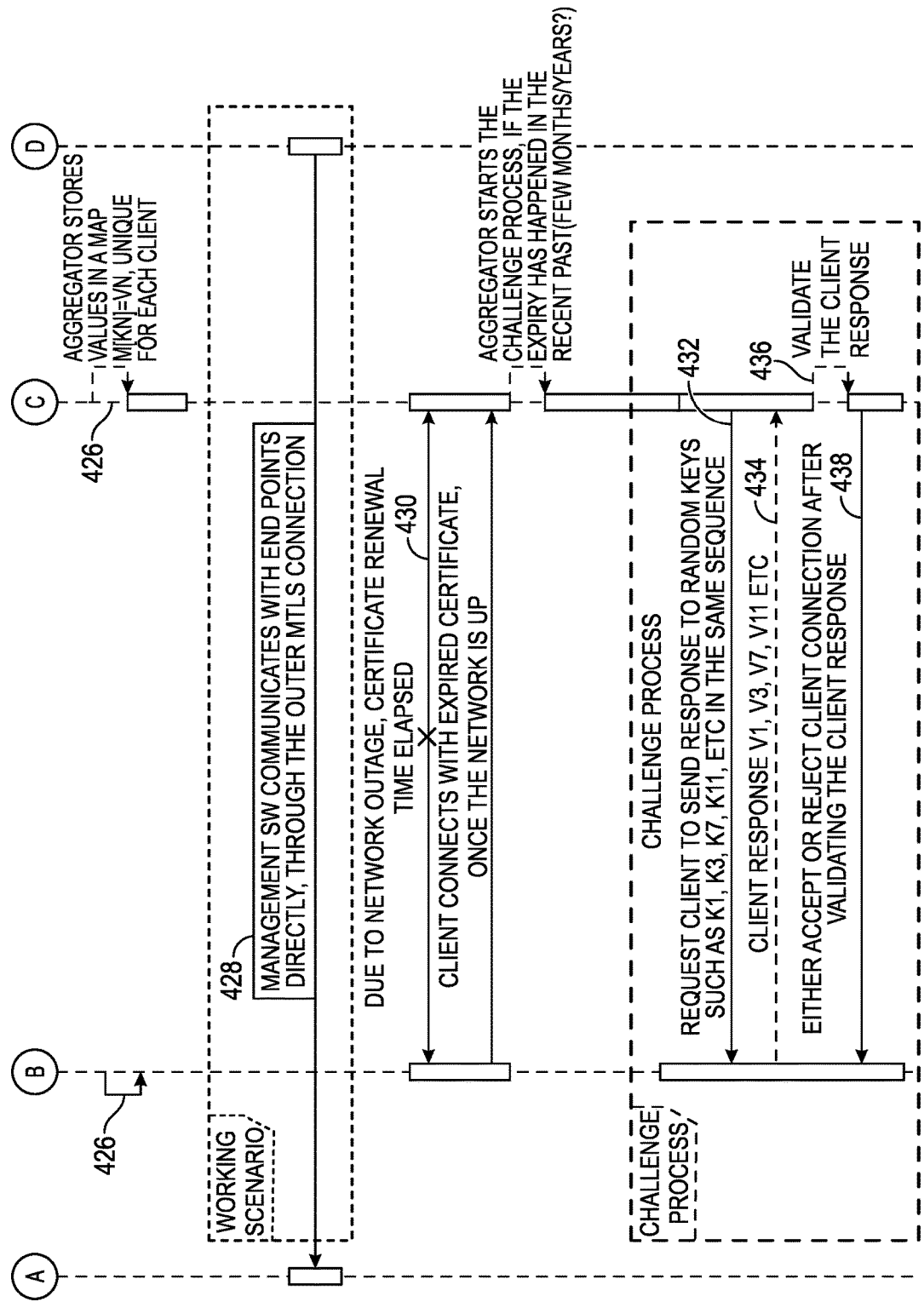

FIGS. 4A and 4B illustrate an example identity credential re-claiming method 400 according to one embodiment of the present disclosure. For example, the following steps describe a process of reclaiming/trusting the remote cloud computing client 320, when the cloud computing client 320 fails to renew the secure credentials with the time window as described above. In one embodiment, the method 400 may be performed in whole, or in part, by the computing environment 300 as described herein above. In other embodiments, the method 400 may be performed by any suitable IHS or combination of IHSs 200, such as those that are configured on a publicly available network.

In general, steps 402-418 describe acts that may be performed for the cloud computing aggregator 310 to initially claim the remote node through a secure channel. At step 402, the cloud computing client 320 generates a CSR (certificate request) and connects (announces) to the cloud computing aggregator 310 at step 404. At step 406, the cloud computing aggregator 310 starts an OAuth process (device code flow) or equivalent process to authenticate the device. At step 408, the cloud computing aggregator 310, upon receiving the device-code/user-code (or an equivalent type of credentials), attempts to exchange this information for a valid token. For example, the cloud computing aggregator 310 may poll the cloud computing client 320 continually (e.g., in loops) to exchange the information for a valid token.

At step 410, the cloud computing client 320, via user input of a user (e.g., a Site Reliability Engineer (SRE)) logs into the organization's portal using personal credentials and authenticates the device/user code. At step 412, the cloud computing aggregator 310 returns a valid token to the remote client. Thereafter at step 416, the cloud computing aggregator 310 pushes a CA signed certificate to the cloud computing client 320. The cloud computing client 320, at step 418, creates a websocket using the valid token, which the cloud computing aggregator 310 validates and accepts (or rejects). At this point, the certificate has been generated and shared between the cloud computing client 320 and cloud computing aggregator 310 so that the cloud computing client 320 may commence use of the services provided by the management clusters 314.

Steps 420-426 generally describe one example technique that may be used to generate the first and second set of keys 342, 344. At step 420, the cloud computing aggregator 310 generates a sequence of 'N' random first set of keys 342. The keys may comprise any random sequence of alpha-numeric text symbols. For example, 'N' may be an arbitrary number, and each first key 342 may be a nonce value derived from random data such as a UUID, or a hash of random prime number, and the like. The cloud computing aggregator 310 then sends the generated first keys 342 to the cloud computing client 320 at step 422. At step 424, the cloud computing client 320 generates the second set of keys 344, one for each first key 342. In one embodiment, each second key 344 may be a random value, such as one derived from a UUID, or a hash of the random prime number. The cloud computing client 320 then sends the second set of keys 344 to the cloud computing aggregator 310. At step 426, both the cloud computing aggregator 310 and cloud computing client 320 securely stores (e.g., protects) the map of random nonce-value pair (e.g., {k1:V1, k2:V2, k3:V3, k4:V4, k5:V5 . . . , Kn:Vn}, where k1-n represent the first set of keys 342, and V1-n represent the second set of keys 344). The map of random nonce-value pairs may be unique for each cloud computing client 320 that uses the management clusters 314 of the cloud computing service 302.

At step 428, the cloud computing client 320 may now establish mTLS (mutual TLS) using the CA signed certificate with the cloud computing aggregator 310. This step completes the process of claiming a remote client through secure process. At this point, the cloud computing client 320 may utilize the management clusters 314, such as remote monitoring, telemetry data collection, and the like are now free to communicate with the remote end points 322 (e.g., device/node/software/VM/microservice etc.) through the trusted mTLS connection, established between the cloud computing client 320 and cloud computing aggregator 310. Either the cloud computing aggregator 310 or the cloud computing client 320 can initiate and close their mutual communication channel as long as the certificate used in the connection is valid.

At some point later at step 430, once the CA signed certificate expires, the cloud computing client 320 is no longer trusted. At step 432-438, the cloud computing aggregator 310 and cloud computing client 320 enter a challenge (e.g., re-negotiation) process as described in the following, only if the client credentials can be recognized by the aggregator. At step 432, the cloud computing aggregator 310 sends the list of first keys 342 (e.g., random nonces (of value M, M<N) such as [K1, K3, K7, k11, K17 . . . Km]) to the cloud computing client 320. The cloud computing client 320, at step 434, responds with the second keys 344 (e.g., appropriate values against each specific key, such as [K1: V1, K3:V3, K7:V7, K11:V11, K17:V17 . . . km:Vm]. At step 436, the cloud computing aggregator 310 validates the response, and at step 438, it either accepts or rejects the connection based upon the validation.

At this point, the certification has been re-claimed and the cloud computing aggregator 310 may send to the cloud computing client 320, a valid CA signed certificate along with a fresh set of random nonce values using a renegotiation process since the previous set of key-value pairs has been used up to identify the client with the expired certificate. Moreover, the previously use set of key-value pairs is discard and a fresh set of key-value pairs is generated and shared, following the same challenge mechanism, between the server and client along with a new signed certificate. That is, the cloud computing aggregator 310 may generate a new set of first keys 342 to be used for the next time that the cloud computing client 320 needs to be re-claimed. For example, steps 420-426 may be performed again so that a new set of first and second keys 342, 344 may be generated and shared among both the cloud computing aggregator 310 and cloud computing client 320.

The aforedescribed method 400 may be performed each time that the cloud computing aggregator 310 is claimed for the first time, or when the cloud computing aggregator 310 needs to be re-claimed after its certificate expires. Nevertheless, when use of the method 400 is no longer needed or desired, the process ends.

Although FIG. 4 describes an example method 400 that may be performed to reclaim a cloud computing client 320, the features of the disclosed processes may be embodied in other specific forms without deviating from the spirit and scope of the present disclosure. For example, certain steps of the disclosed method 400 may be performed sequentially, or alternatively, they may be performed concurrently. As another example, the method 400 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A server Information Handling System (IHS) comprising:
   at least one processor; and
   at least one memory coupled to the at least one processor, the at least one memory having program instructions stored thereon that, upon execution by the processor, cause the IHS to, when a signed certificate associated with a client expires:
      challenge a client IHS by transmitting a plurality of first keys to the client IHS, wherein the client IHS is configured to respond to the challenge by associating each of the first keys with a plurality of second keys, pairing each of the first key with its associated second key, sending the paired first and second keys to the server IHS; and
      authenticate the client IHS by verifying that each of the first plurality of keys is associated with the second plurality of keys.

2. The server IHS of claim 1, wherein the instructions, upon execution, cause the server IHS to generate the plurality of first keys, and send the plurality of first keys to the client IHS.

3. The server IHS of claim 2, wherein the instructions, upon execution, cause the server IHS to generate the first keys when the client IHS is being claimed or re-claimed.

4. The server IHS of claim 2, wherein the client IHS comprises at least one client processor and at least one client memory coupled to the at least one client processor, the at least one client memory having client program instructions stored thereon that, upon execution by the client processor, cause the client IHS to, when the first keys are received from the server IHS, generate the plurality of second keys based upon the first keys, and send the plurality of second keys to the server IHS.

5. The server IHS of claim 4, wherein the instructions, upon execution, cause the server IHS to securely store the first keys and the second keys in a secure region of the server memory, and cause the client IHS to securely store the first keys and the second keys in a secure region of the client memory.

6. The server IHS of claim 1, wherein the instructions, upon execution, cause the server IHS to, when the client IHS has been authenticated:
   delete the existing first and second keys;
   generate another plurality of first keys; and
   send the first keys to the client IHS, wherein the client IHS is configured to generate another plurality of second keys based upon the other first keys, and send the other plurality of second keys to the server IHS.

7. The server IHS of claim 1, wherein the server IHS is a distributed software management server, and the client IHS comprises one of a plurality of client IHSs.

8. The server IHS of claim 7, wherein the instructions, upon execution, cause the server IHS to generate the first keys uniquely for each client IHS.

9. The server IHS of claim 1, wherein the instructions, upon execution, cause the server IHS to authenticate the client IHS by verifying that each of the first plurality of keys is mapped to a specified order with respect to the second plurality of keys.

10. The server IHS of claim 1, wherein the instructions, upon execution, cause the server IHS to create a websocket with the client IHS, and convey the first keys to the client IHS through the websocket.

11. An identity credential re-claiming method comprising:
challenging, by a server Information Handling System (HIS), a client IHS by transmitting a plurality of first keys to a client IHS,
responding, by the client IHS, to the challenge by associating each of the first keys with a plurality of second keys, pairing each of the first key with its associated second key, and sending the paired first and second keys to the server IHS; and
authenticating, by the server IHS, the client IHS by verifying that each of the first plurality of keys is associated with the second plurality of keys.

12. The identity credential re-claiming method of claim 11, further comprising generating the plurality of first keys, and sending the plurality of first keys to the client IHS.

13. The identity credential re-claiming method of claim 12, further comprising generating the first keys when the client IHS is being claimed or re-claimed.

14. The identity credential re-claiming method of claim 12, further comprising, when the first keys are received from the server IHS, generating, by the client IHS, the plurality of second keys based upon the first keys, and send the plurality of second keys to the server IHS.

15. The identity credential re-claiming method of claim 14, further comprising securely storing the first keys and the second keys in a secure region of a server memory of the server IHS, and securely storing the first keys and the second keys in a secure region of a client memory of the client IHS.

16. The identity credential re-claiming method of claim 11, further comprising, after the client IHS has been authenticated:
deleting, by the server IHS and the client IHS, the existing first and second keys;
generating, by the server IHS, another plurality of first keys; and
sending, by the server IHS, the first keys to the client IHS;
generating, by the client IHS, another plurality of second keys based upon the other first keys; and
sending, by the client IHS, the other plurality of second keys to the server IHS.

17. The identity credential re-claiming method of claim 16, further comprising generating the first keys uniquely for each of a plurality of client IHSs, wherein the server IHS comprises a distributed software management server.

18. The identity credential re-claiming method of claim 11, further comprising authenticating the client IHS by verifying that each of the first plurality of keys is mapped to a specified order with respect to the second plurality of keys.

19. A client Information Handling System (IHS) comprising:
at least one processor; and
at least one memory coupled to the at least one processor, the at least one memory having program instructions stored thereon that, upon execution by the processor, cause the IHS to:
receive a plurality of first keys from a server IHS, the server IHS configured to send the first keys when the client IHS is to be claimed by the server IHS;
generate a plurality of second keys by associating each of the first keys with each of the plurality of second keys, pairing each of the first key with its associated second key, sending the paired first and second keys to the server IHS, wherein the server IHS is configured to authenticate the client IHS by verifying that each of the first plurality of keys is associated with the second plurality of keys.

20. The client IHS of claim 19, wherein the instructions, upon execution, cause the client IHS to, after the client IHS has been authenticated:
delete the existing first and second keys from the memory;
receive another plurality of first keys from the server IHS;
generate another plurality of second keys based upon the first keys; and
send the second keys to the server IHS.

* * * * *

UNITED STATES PATENT AND TRADEMARK OFFICE
CERTIFICATE OF CORRECTION

| | | |
|---|---|---|
| PATENT NO. | : 12,155,645 B2 | Page 1 of 1 |
| APPLICATION NO. | : 18/050079 | |
| DATED | : November 26, 2024 | |
| INVENTOR(S) | : Viswanath Ponnuru, Magesh Kumar Sivaswamy and Judith A. Furlong | |

It is certified that error appears in the above-identified patent and that said Letters Patent is hereby corrected as shown below:

In the Claims

In Column 19, Line 3, Claim 11, delete "(HIS), a client IHS by transmitting a plurality of first" and insert -- (IHS), a client IHS by transmitting a plurality of first -- therefor.

Signed and Sealed this
Thirty-first Day of December, 2024

Derrick Brent
*Acting Director of the United States Patent and Trademark Office*